(12) United States Patent
Shu et al.

(10) Patent No.: US 10,609,256 B2
(45) Date of Patent: Mar. 31, 2020

(54) IMAGING APPARATUS MANAGEMENT SYSTEM AND OPERATION METHOD OF AN IMAGING APPARATUS MANAGEMENT SYSTEM

(71) Applicant: Transcend Information, Inc., Taipei (TW)

(72) Inventors: Tao-Ann Shu, Taipei (TW); Kuan-Jen Chen, Yilan County (TW)

(73) Assignee: Transcend Information, Inc., Taipei (TW)

( * ) Notice: Subject to any disclaimer, the term of this patent is extended or adjusted under 35 U.S.C. 154(b) by 132 days.

(21) Appl. No.: 15/880,559

(22) Filed: Jan. 26, 2018

(65) Prior Publication Data

US 2019/0238720 A1      Aug. 1, 2019

(51) Int. Cl.
```
H04N 1/44      (2006.01)
H04N 5/247     (2006.01)
H04N 5/232     (2006.01)
G06K 9/00      (2006.01)
G06Q 50/26     (2012.01)
G06Q 10/06     (2012.01)
```

(52) U.S. Cl.
CPC ....... *H04N 1/4433* (2013.01); *G06K 9/00892* (2013.01); *G06K 9/00986* (2013.01); *G06Q 10/0631* (2013.01); *G06Q 50/26* (2013.01); *H04N 1/442* (2013.01); *H04N 1/4426* (2013.01); *H04N 5/23241* (2013.01); *H04N 5/247* (2013.01); *G06K 9/00087* (2013.01); *G06K 9/00268* (2013.01); *G06K 9/00617* (2013.01); *H04N 2201/0084* (2013.01)

(58) Field of Classification Search
CPC .. H04N 1/4433; H04N 5/23241; H04N 1/442; H04N 2201/0058; G06K 9/00617; G06K 9/00268
See application file for complete search history.

(56) References Cited

U.S. PATENT DOCUMENTS

2002/0051080 A1* 5/2002 Tanaka ................... H04N 5/232
                                                        348/552
2002/0149695 A1* 10/2002 Kayanuma ......... H04N 1/00127
                                                        348/375
2017/0180359 A1* 6/2017 Wolski ................ H04L 63/0861

* cited by examiner

*Primary Examiner* — Ahmed A Berhan
(74) *Attorney, Agent, or Firm* — Winston Hsu

(57) ABSTRACT

An image apparatus management system includes a plurality of image apparatuses, a transmission device, and a processor. Each image apparatus of the plurality of image apparatuses is utilized to record surrounding images and generates at least one image file. The transmission device has a plurality of ports for electrically connecting to the plurality of image apparatuses. The processor is used for selecting at least one image apparatus according to a comparison condition from at least one image apparatus currently connected with the transmission device as at least one standby image apparatus to be utilized.

21 Claims, 9 Drawing Sheets

IMAGING APPARATUS MANAGEMENT SYSTEM AND OPERATION METHOD OF AN IMAGING APPARATUS MANAGEMENT SYSTEM

BACKGROUND

1. Technical Field

The present invention relates to an image apparatus management system and an operation method of the image apparatus management system, and particularly to an image apparatus management system and an operation method that can automatically select an image apparatus as a standby image apparatus according to a comparison condition and generate an image file link between the standby image apparatus and the identification information.

2. Description of the Conventional Art

In shared image apparatus system provided by the prior art, after an authorized user selects an image apparatus of a plurality of image apparatuses connected to a transmission device of the shared image apparatus system, the authorized user needs to log in a host of the shared image apparatus system to record an identification code of the image apparatus and a name of a current authorized user (i.e. the authorized user) utilizing the image apparatus in the host.

However, remaining power of the image apparatus selected by the authorized user may be insufficient (e.g. the remaining power of the image apparatus less than a predetermined percentage), or image files corresponding to a previous authorized user has not been stored in the host and erased, so the authorized user will feel troubled and inconvenient, resulting in utilization willingness of the authorized user being reduced.

Therefore, the shared image apparatus system provided by the prior art is not a good shared image apparatus system for the authorized user.

SUMMARY

An embodiment of the present invention provides an image apparatus management system. The image apparatus management system includes a plurality of image apparatuses, a transmission device, and a host. Each image apparatus of the plurality of image apparatuses is utilized to record surrounding images and generates at least one image file. The transmission device has a plurality of ports for electrically connecting to the plurality of image apparatuses. The host is used for selecting at least one image apparatus according to a comparison condition from at least one image apparatus currently connected with the transmission device as at least one standby image apparatus to be utilized.

Another embodiment of the present invention provides an operation method of an image apparatus management system, wherein the image apparatus management system includes a plurality of image apparatuses, a transmission device, and a host. The operation method includes receiving identification information corresponding to an authorized user; selecting at least one image apparatus according to a comparison condition from at least one image apparatus currently connected with the transmission device as at least one standby image apparatus; selecting a standby image apparatus from the at least one standby image apparatus as a selected standby image apparatus and transmitting the identification information to the selected standby image apparatus; and generating an image file link between the selected standby image apparatus and the identification information, wherein at least one image file generated by the selected standby image apparatus corresponds to the image file link.

The present invention provides an image apparatus management system and an operation method of the image apparatus management system. The image apparatus management system and the operation method utilize a host to select at least one image apparatus according to a comparison condition from at least one image apparatus currently connected to a transmission device as at least one standby image apparatus, select a standby image apparatus from the at least one standby image apparatus as a selected standby image apparatus, and generate an image file link between the selected standby image apparatus and identification information corresponding to an authorized user. Therefore, compared to the prior art, because the present invention selects the at least one image apparatus according to the comparison condition, remaining power and available memory space of the at least one image apparatus must be sufficient. In addition, because the present invention can select the standby image apparatus and generate the image file link between the selected standby image apparatus and the identification information, the authorized user will feel convenient, be willing to utilize the image apparatus management system, and be easy to execute category search on a plurality of image files generated by the plurality of image apparatuses of the image apparatus management system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
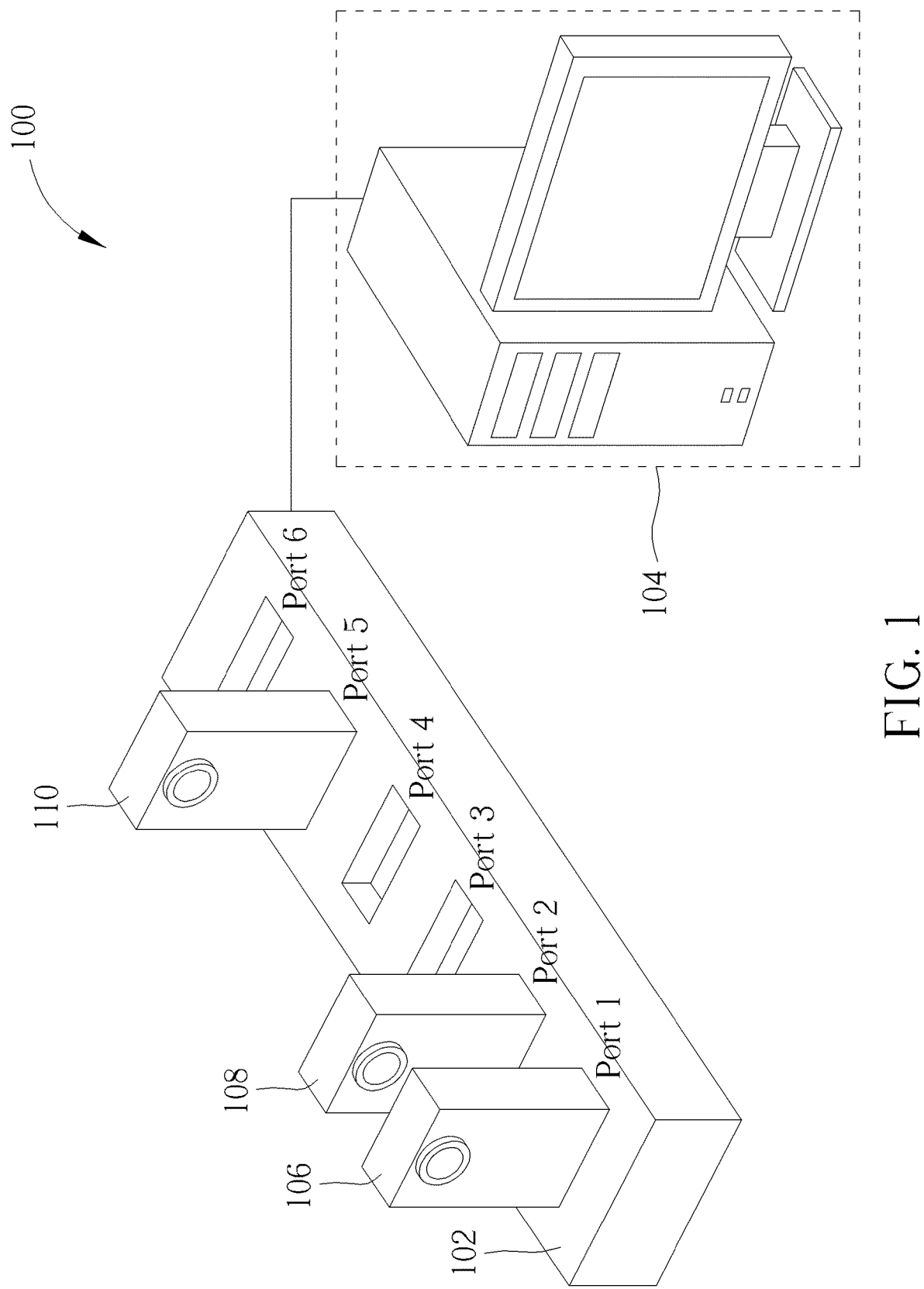
FIG. 1 is a diagram illustrating an image apparatus management system according to a first embodiment of the present invention.

Please refer to FIG. 1. FIG. 1 is a diagram illustrating an image apparatus management system 100 according to a first embodiment of the present invention, wherein the image apparatus management system 100 includes a plurality of image apparatuses for capturing the surrounding image, a transmission device 102 for connecting the plurality of image apparatuses, and a control module integrated in a host 104 for using on image apparatuses management, data transmission and power management, wherein the control module can be a chip such as a field programmable gate array (FPGA), an application-specific integrated circuit (ASIC) . . . etc., or an integrated circuit with the relevant functions, or a software module executed by the relevant hardware in the image apparatus management system 100. Wherein the transmission device 102 includes, but not limited to, a docking station or a multi-port cable/hub. But, in another embodiment of the present invention, the control module can be integrated in the transmission device 102 or another external device which is electrically connected to the transmission device 102 or the host 104 through its connection interface. In another embodiment of the present invention, the host 104 including the control module can be integrated with the transmission device 102 as one single device. In addition, the present invention is not limited to the transmission device 102 only including port 1-port 6 which let image apparatuses be connected to the transmission device 102. As shown in FIG. 1, image files generated by the image apparatuses 106, 108, 110 can be automatically copied to a storage device of the transmission device 102, the host 104 or another external device and simultaneously charge the image apparatuses 106, 108, 110 through the ports 1, 2, 5 when the image apparatuses 106, 108, 110 are connected to the transmission device 102 through the ports 1, 2, 5 respectively. In addition, because the image files can be generated by the image apparatuses 106, 108, 110, it is obvious to one of ordinary skill in the art that each image apparatus of the image apparatuses 106, 108, 110 at least includes lens and an image sensor (e.g. complementary metal-oxide-semiconductor image sensor or charge-coupled device image sensor). However, in another embodiment of the present invention, the copy procedure abovementioned is executed by the image apparatuses 106, 108, 110 until the image apparatuses 106, 108, 110 respectively receive a corresponding copy command sent from the transmission device 102, the host 104 or another external device which is electrically connected to the transmission device 102 when the image apparatuses 106, 108, 110 are connected to the transmission device 102 through the ports 1, 2, 5 respectively. In addition, the image files generated by the image apparatuses 106, 108, 110 can be erased after copying the image files generated by the image apparatuses 106, 108, 110 to the storage device of the transmission device 102, the host 104 or another external device. However, in another embodiment of the present invention, the transmission device 102 only charges the image apparatuses 106, 108, 110 through the ports 1, 2, 5, and does not automatically copy the image files generated by the image apparatuses 106, 108, 110 to the storage device of the transmission device 102, the host 104 or another external device when the image apparatuses 106, 108, 110 are connected to the transmission device 102 through the ports 1, 2, 5 respectively. For example, the image files generated by the image apparatus 106 is not automatically copied to the storage of the host 104 until a first authorized user intends to utilize the image apparatus 106 and the first authorized user utilizes the control module of the host 104 to generate a copy command to the image apparatus 106 through the transmission device 102. Therefore, after the image apparatus 106 receives the copy command, the image files generated by the image apparatus 106 can be first copied to the host 104 according to the copy command, and then erase the image files generated by the image apparatus 106. In addition, in another embodiment of the present invention, for example, when the image apparatus 106 is connected to the transmission device 102 through the port 1 by a current authorized user, the transmission device 102 or the image apparatus 106 can utilize at least one of first special light, first special sound, and first vibration to notice the current authorized user to utilize the host 104 to generate the copy command and send to the image apparatus 106, and then the image files generated by the image apparatus 106 will be copied to the host 104. In addition, in one embodiment of the present invention, the host 104 can be a personal computer, a laptop, a tablet, or a handheld device (e.g. a smart phone). In addition, in one embodiment of the present invention, because the host 104 can charge the image apparatuses 106, 108, 110 through the ports 1, 2, 5, the control module included in the host 104 needs to integrate a power management device.

Figure 2:
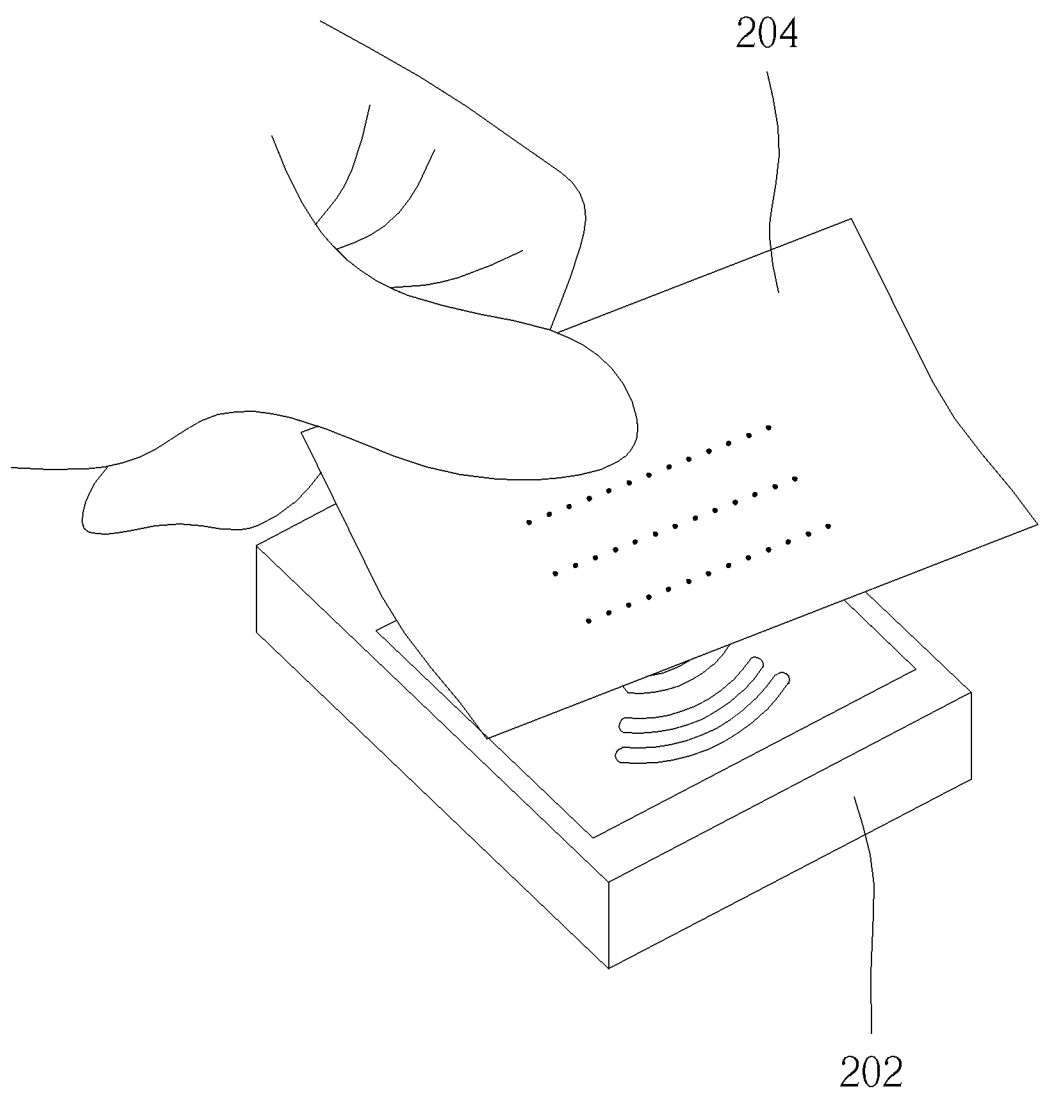
FIG. 2 is a diagram illustrating the second authorized user utilizing the reader to read an identification card to input an identification information to the host.

When a second authorized user intends to utilize one of the image apparatuses 106, 108, 110 connected to the transmission device 102, the second authorized user needs to log in the host 104 and inputs identification information corresponding to the second authorized user to the host 104 through an input interface (e.g. a keyboard, or a touch screen, or sound recognition device) of the host 104, wherein in one embodiment of the present invention, the identification information is a set of numbers (e.g. a password) corresponding to the second authorized user. However, in another embodiment of the embodiment of the present invention, as shown in FIG. 2, the second authorized user can utilize a card reader 202 coupled to (or integrated in) the host 104 (or the transmission device 102 in another embodiment) to read (e.g. swipe or scan) an identification card 204 to input an identification number (that is, the identification information) to the host 104. In addition, in another embodiment of the embodiment of the present invention, the second authorized user can utilize a biological identification device coupled to (or integrated in) the host 104 to input a biological feature of the second authorized user (that is, the identification information) to the host 104, wherein the biological identification device utilizes a biological feature identification technology which is obvious to one of ordinary skill in the art to read the biological feature of the second authorized user, and the biological feature of the second authorized user can be an iris, fingerprint, palm pattern, face feature of the second authorized user.

In addition, in another embodiment of the present invention, the identification information is a set of symbols, texts, numbers, the biological feature of the second authorized user, or combination thereof.

In addition, after the host 104 receives the identification information inputted by the second authorized user, the control module of the host 104 will verify the identification information inputted by the second authorized user according to identification information corresponding to the second authorized user stored in a database of the host 104. In another embodiment, the transmission device 102 or an external device electrically connected to the transmission device 102 or the host 104 could be an alternative to verify the identification information inputted by the second authorized user according to identification information corresponding to the second authorized user stored in any database. In addition, when the transmission device 102 can verify the identification information inputted by the second authorized user, it is obvious that the transmission device 102 needs to includes a processor to verify the identification information inputted by the second authorized user, wherein the processor can be a field programmable gate array (FPGA), an application-specific integrated circuit (ASIC) . . . etc., or an integrated circuit with the relevant functions, or a software module executed by the relevant hardware. In addition, in one embodiment of the present invention, because the transmission device 102 can charge the image apparatuses 106, 108, 110 through the ports 1, 2, 5, the processor included in the transmission device 102 needs to have power management function. After verifying the identification information inputted by the second authorized user, the control module can select one image apparatus from the image apparatuses 106, 108, 110 as a standby image apparatuses which will be assigned to the second authorized user according to a comparison condition, wherein the comparison condition includes at least one of whether remaining power of an image apparatus exceeding a first predetermined percentage, whether at least one image file stored in the image apparatus has been copied to the host 104, and whether at least one image file stored in the image apparatus has been erased after the at least one image file stored in the image apparatus has been copied to the host 104, whether memory space of the image apparatus not occupied exceeding a second predetermined percentage or the combination thereof.

In addition, the control module can select more than one image apparatus from the image apparatuses 106, 108, 110 as the standby image apparatuses according to the comparison condition (for example, the control module selects the image apparatuses 106, 108 as the standby image apparatuses according to the comparison condition), and then the control module can randomly select at least one of the image apparatuses 106, 108 as a selected standby image apparatus which will be assigned to the second authorized user (for example, the control module randomly selects the image apparatus 106 as the selected standby image apparatus for the second authorized user), or the second authorized user can freely directly selects at least one of the image apparatuses 106, 108 as the selected standby image apparatus after the control module selects the image apparatuses 106, 108 as the standby image apparatuses according to the comparison condition (for example, the second authorized user can directly selects the standby image apparatus 106 as the selected standby image apparatus which will be utilized by the second authorized user after the control module selects the image apparatuses 106, 108 as the standby image apparatuses according to the comparison condition). Wherein, the image apparatus 106 or the transmission device 102 can generate a special notice to notice the second authorized user which image apparatus is the standby image apparatus after the control module selects at least one of the image apparatus from the image apparatus 106, 108, 110 as the standby image apparatus. For example, the standby image apparatus 106 selected by the control module can generate at least one of special light, special sound, and vibration to notice the second authorized user that the image apparatus 106 is the standby image apparatus.

Figure 3:
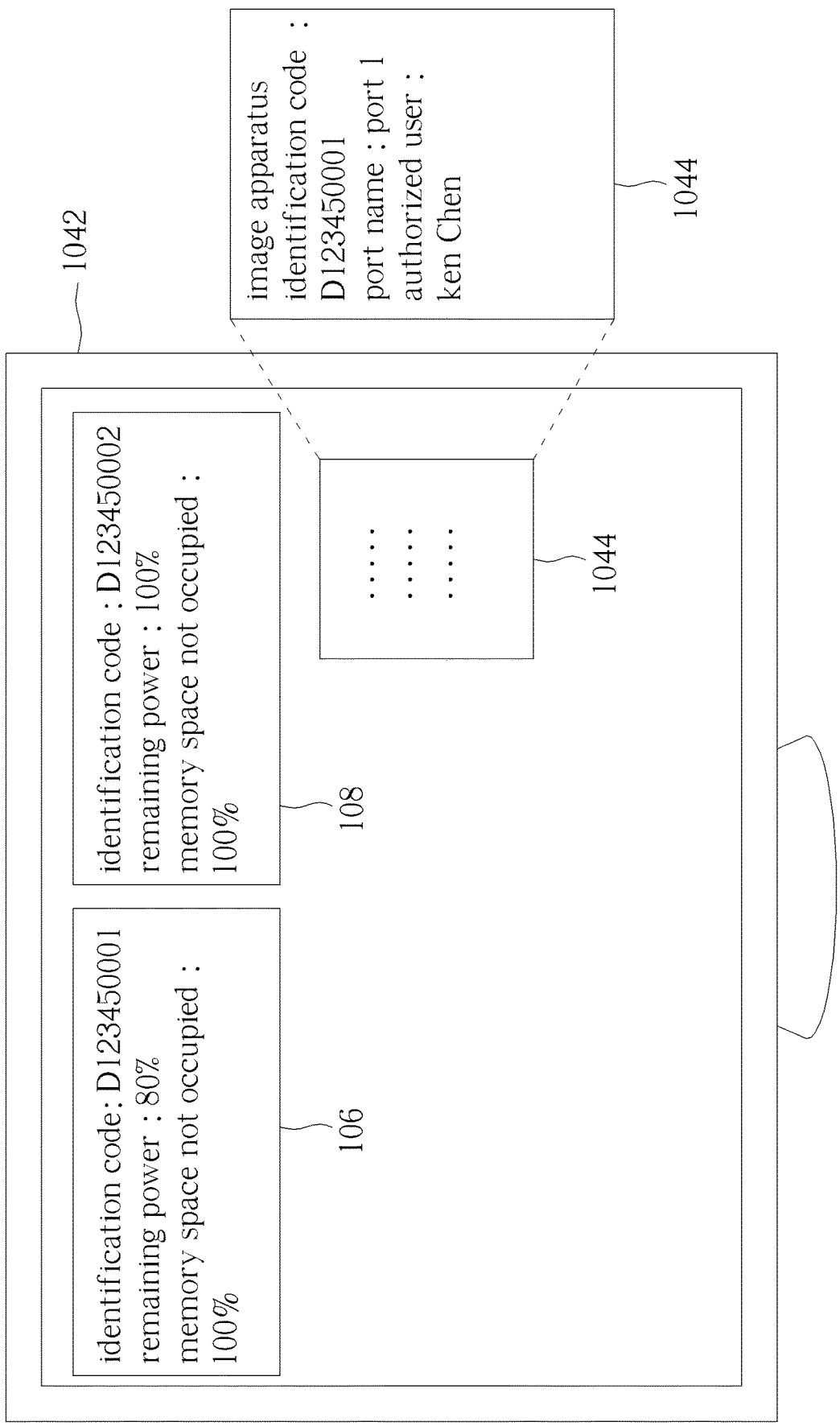
FIG. 3 is a diagram illustrating the display included in the host showing information of the image apparatuses and a pop window which shows an identification code of the image apparatus.
Figure 4:
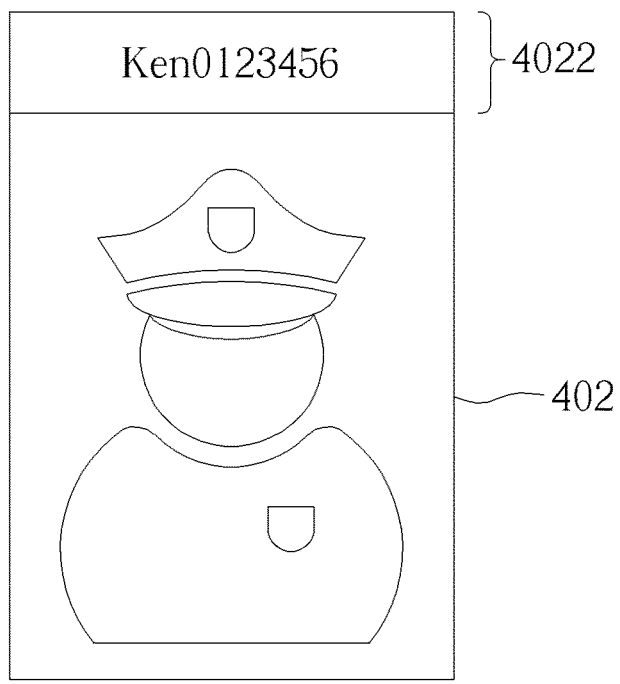
FIG. 4 is a diagram illustrating a header of at least one image file generated by the image apparatus storing the identification information.

Please refer to FIG. 3, a display 1042 coupled to the control module can show at least one image apparatus information (including but not limited to an identification code (i.e. a machine code), remaining power, and memory space not occupied) of the image apparatuses when the at least one image apparatus is connected to the transmission device 102 coupled to the host 104. For example, the display 1042 will shows an identification code (D123450001), remaining power (80%), memory space not occupied (100%) of the image apparatus 106, and an identification code (D123450002), remaining power (100%), memory space not occupied (100%) of the image apparatus 108. In addition, as shown in FIG. 3, the display 1042 will pop a pop window 1044 which shows an identification code of the image apparatus 106 (i.e. the selected standby image apparatus), port name (i.e. the port 1) where the image apparatus 106 is connected, and a name of the second authorized user after the standby image apparatus has been selected by the control module or the authorized user and the control module transmits the identification information inputted by the second authorized user to the image apparatus 106 (the selected standby image apparatus). In addition, the present invention is also not limited to the pop window 1044 showing the identification code of the standby image apparatus 106, the port name where the standby image apparatus 106 is connected, and the name of the second authorized user. After that, the image apparatus 106 (the selected standby image apparatus) stores the identification information and generates an image file link between the image apparatus 106 (the selected standby image apparatus) and the identification information inputted by the second authorized user, wherein in one embodiment of the present invention, when the control module transmits the identification information inputted by the second authorized user to the image apparatus 106 (the selected standby image apparatus), the identification information is also stored in a radio frequency identification (RFID) tag, a near-field communication (NFC) tag or any memory of the image apparatus 106 (the selected standby image apparatus) for checking owner after unplugging the image apparatus 106 (the selected standby image apparatus) by the second authorized user. In addition, in one embodiment of the present invention, as shown in FIG. 4, the image file link corresponds to a header of at least one image file generated by the image apparatus 106 (the selected standby image apparatus) storing the identification information. For example, a header 4022 of an image file 402 generated by the image apparatus 106 stores the password (e.g. ken0123456) corresponding to the second authorized user (i.e. the header 4022 of the image file 402 stores the identification information).

Figure 5:
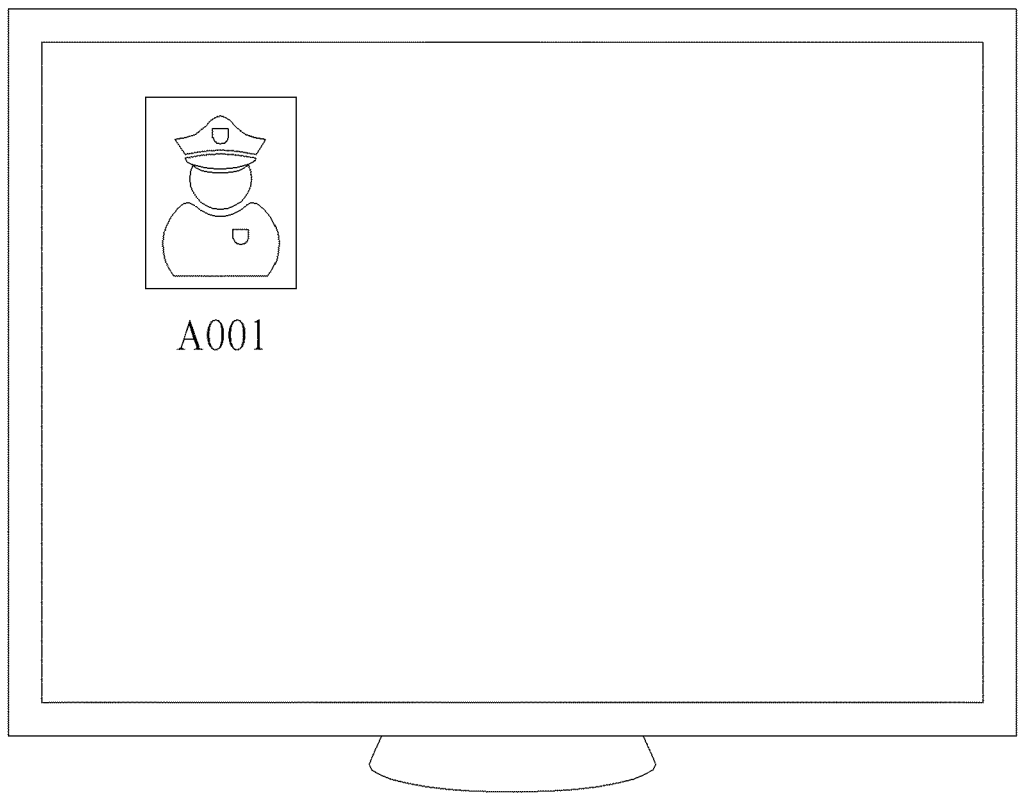
FIG. 5 is a diagram illustrating the identification information acting as a file name of an image file generated by the image apparatus.

In addition, in another embodiment of the present invention, as shown in FIG. 5, the image file link corresponds to the identification information (i.e. the identification number (e.g. A001) corresponding to the second authorized user) acting as a file name of an image file generated by the image apparatus 106.

In addition, in another embodiment of the present invention, the image file link corresponds to a predetermined space of a memory of the host 104 storing at least one image file generated by the image apparatus 106, wherein the predetermined space of the memory only corresponds to the second authorized user, and at least one image file stored in the predetermined space can be only accessed through the identification information corresponding to the second authorized user.

In addition, in one embodiment of the present invention, after the image apparatus 106 (the selected standby image apparatus) is unplugged from the transmission device 102 by the second authorized user, the image apparatus 106 (the selected standby image apparatus) still needs to utilize the identification information stored in the RFID tag, the NFC tag or any memory of the image apparatus 106 (the selected standby image apparatus) to verify the identification information corresponding to the second authorized user through an input interface of the image apparatus 106 (the selected standby image apparatus) to boot up or start to generate an image file after booting the image apparatus 106 (the selected standby image apparatus) when the second authorized user intends to utilize the image apparatus 106 (the selected standby image apparatus) to generate the image file. That is to say, after the image apparatus 106 (the selected standby image apparatus) is unplugged from the transmission device 102 by the second authorized user, another authorized user cannot utilize the image apparatus 106 (the selected standby image apparatus) to generate any image file because the image apparatus 106 (the selected standby image apparatus) needs to verify the identification information corresponding to the second authorized user.

Figure 6:
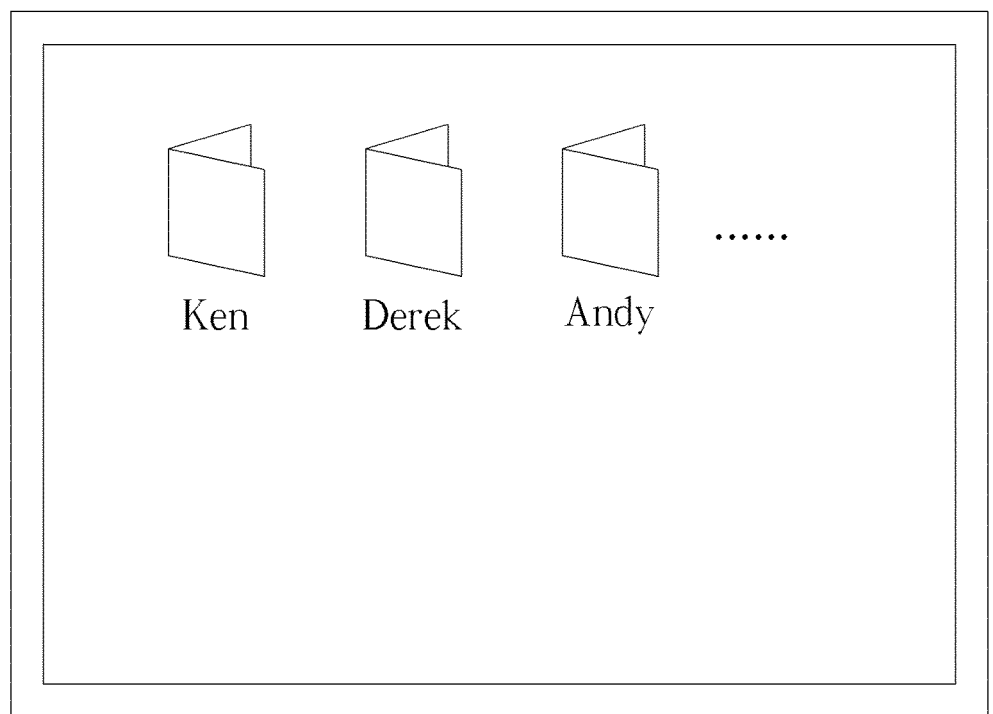
FIGS. 6-9 are diagrams illustrating the host classifying the plurality of image files by names, generation dates, shooting locations, or image attributes of the plurality of image files.
Figure 7:
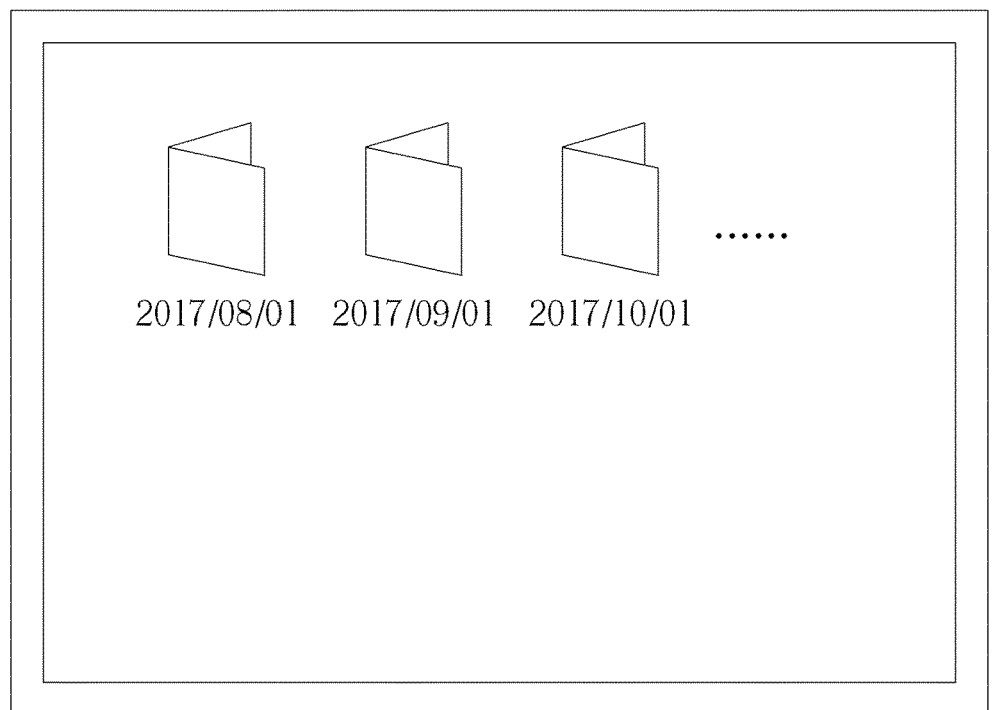
Figure 8:
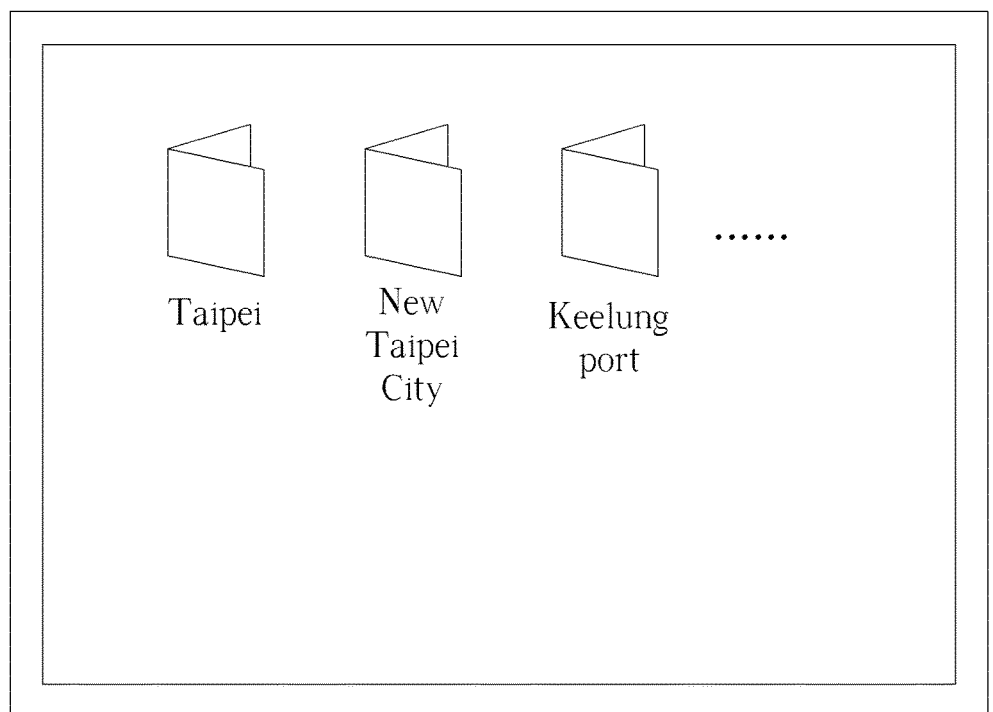
Figure 9:
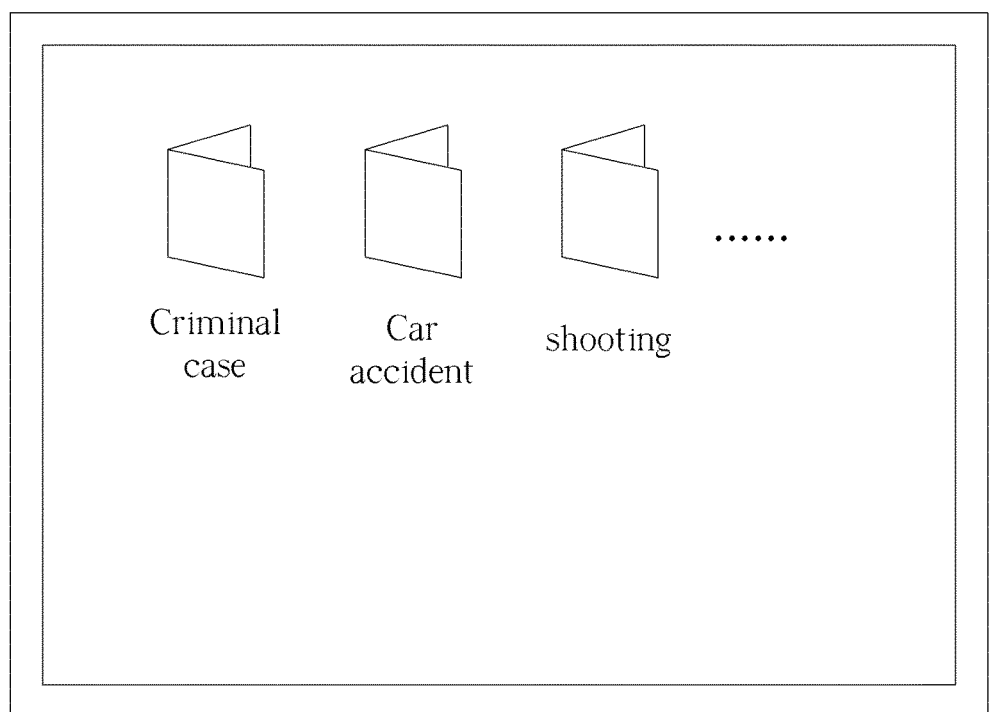

In addition, in one embodiment of the present invention, the control module further classifies the plurality of image files generated by the selected standby image apparatus based on the attribution of the image file link corresponding to the plurality of image files generated by the selected standby image apparatus and the identification information of the authorized user, and the plurality of classified image files will be stored in the database or the storage device coupled to the host 104. Wherein, the classification can be made by names (e.g. Ken, Derek, Andy, . . . etc.) of authorized users who utilize the image apparatus management system 100 (as shown in FIG. 6), generation dates (e.g. 2017 Aug. 1, 2017 Sep. 1, 2017 Oct. 1, . . . etc.) of the plurality of image files (as shown in FIG. 7), shooting locations (e.g. Taipei, New Taipei City, Keelung port, . . . etc.) of the plurality of image files (as shown in FIG. 8), or image characteristics (e.g. criminal case, car accident, shooting, . . . etc.) of the plurality of image files (as shown in FIG. 9) to make the authorized users utilizing the image apparatus management system 100 be easy to execute category search on the plurality of image files.

Figure 10:
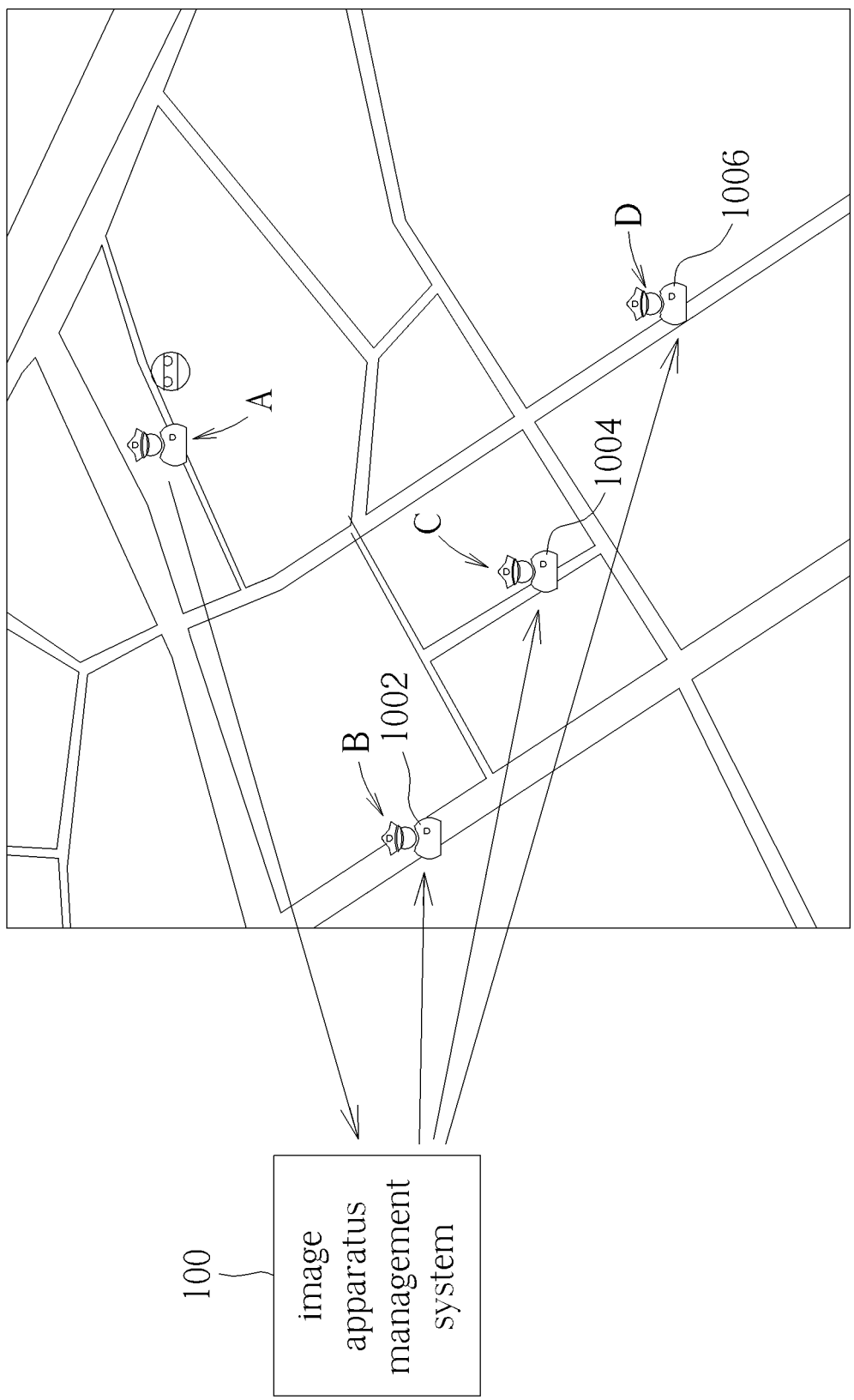
FIG. 10 is a diagram illustrating the image apparatus returning a current position of the image apparatus held by the second authorized user to the image apparatus management system through Global Positioning System and at least one mobile phone base station near the image apparatus.

In addition, as shown in FIG. 10, the image apparatus 106 (the selected standby image apparatus) can return a current position A of the image apparatus 106 (the selected standby image apparatus) held by the second authorized user to the image apparatus management system 100 through Global Positioning System (GPS) and at least one mobile phone base station near the image apparatus 106 (the selected standby image apparatus), and then the host 104 of the image apparatus management system 100 can notice a third authorized user 1002 located at a position B, a fourth authorized user 1004 located at a position C, and a fifth authorized user 1006 located at a position D to assist the second authorized user, wherein the third authorized user 1002, the fourth authorized user 1004, and the fifth authorized user 1006 hold other selected standby image apparatuses different from the image apparatuses 106 (the selected standby image apparatus). But, the present invention is not limited to the image apparatus management system 100 only noticing the third authorized user 1002, the fourth authorized user 1004, and the fifth authorized user 1006 to assist the second authorized user.

Figure 11:
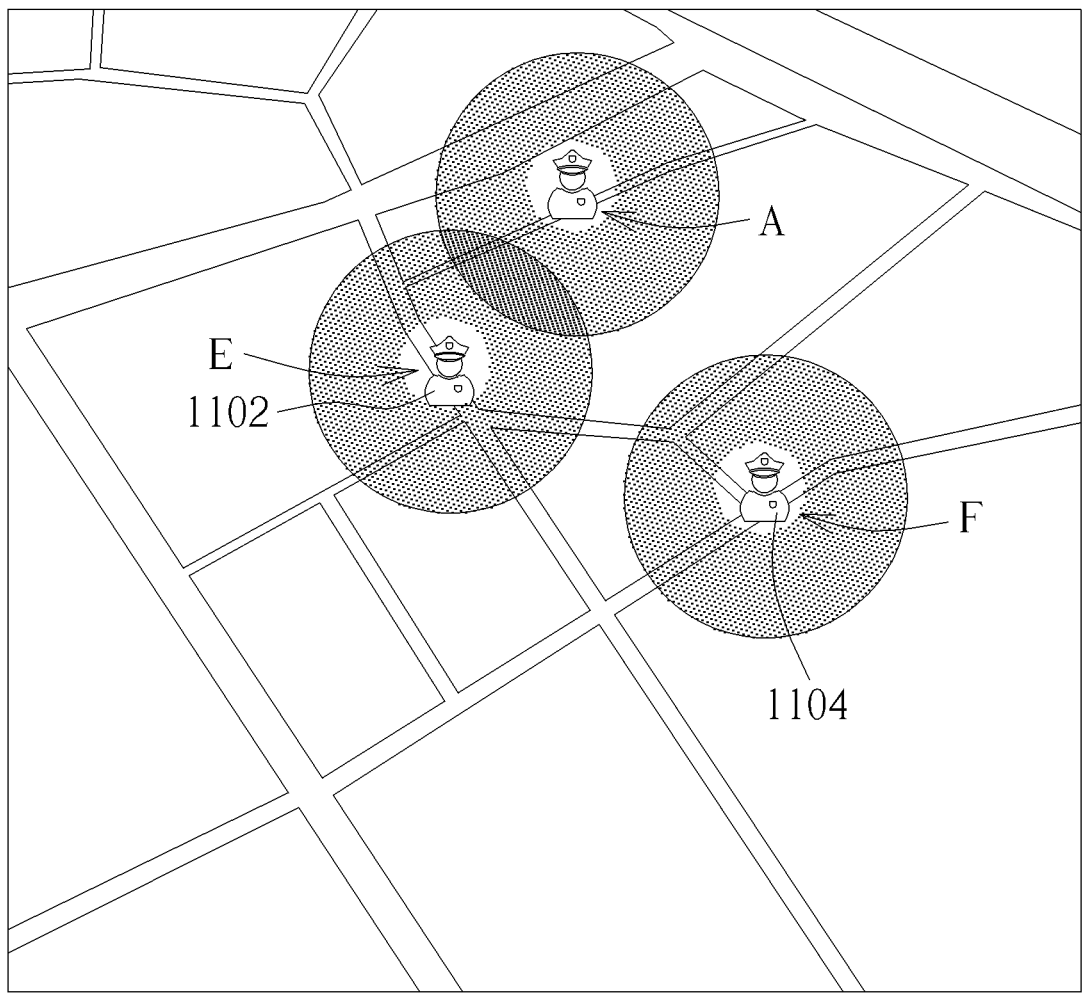
FIG. 11 is a diagram illustrating another authorized user being away from the second authorized user within a predetermined distance.

In addition, as shown in FIG. 11, the image apparatus 106 (the selected standby image apparatus) is located at the current position A . . . , an image file generated by the image apparatus 106 will simultaneously correspond to the sixth authorized user 1102 and the second authorized user (e.g. in one embodiment of the present invention, a header of the image file generated by the image apparatus 106 stores the identification information corresponding to the second authorized user and an identification information corresponding to the sixth authorized user) . . . as shown in FIG. 11, because a seventh authorized user 1104 located at a position F is away from the second authorized user outside the predetermined distance, in one embodiment of the present invention, the header of the image file generated by the image apparatus 106 does not store an identification information corresponding to the seventh authorized user.

Figure 12:
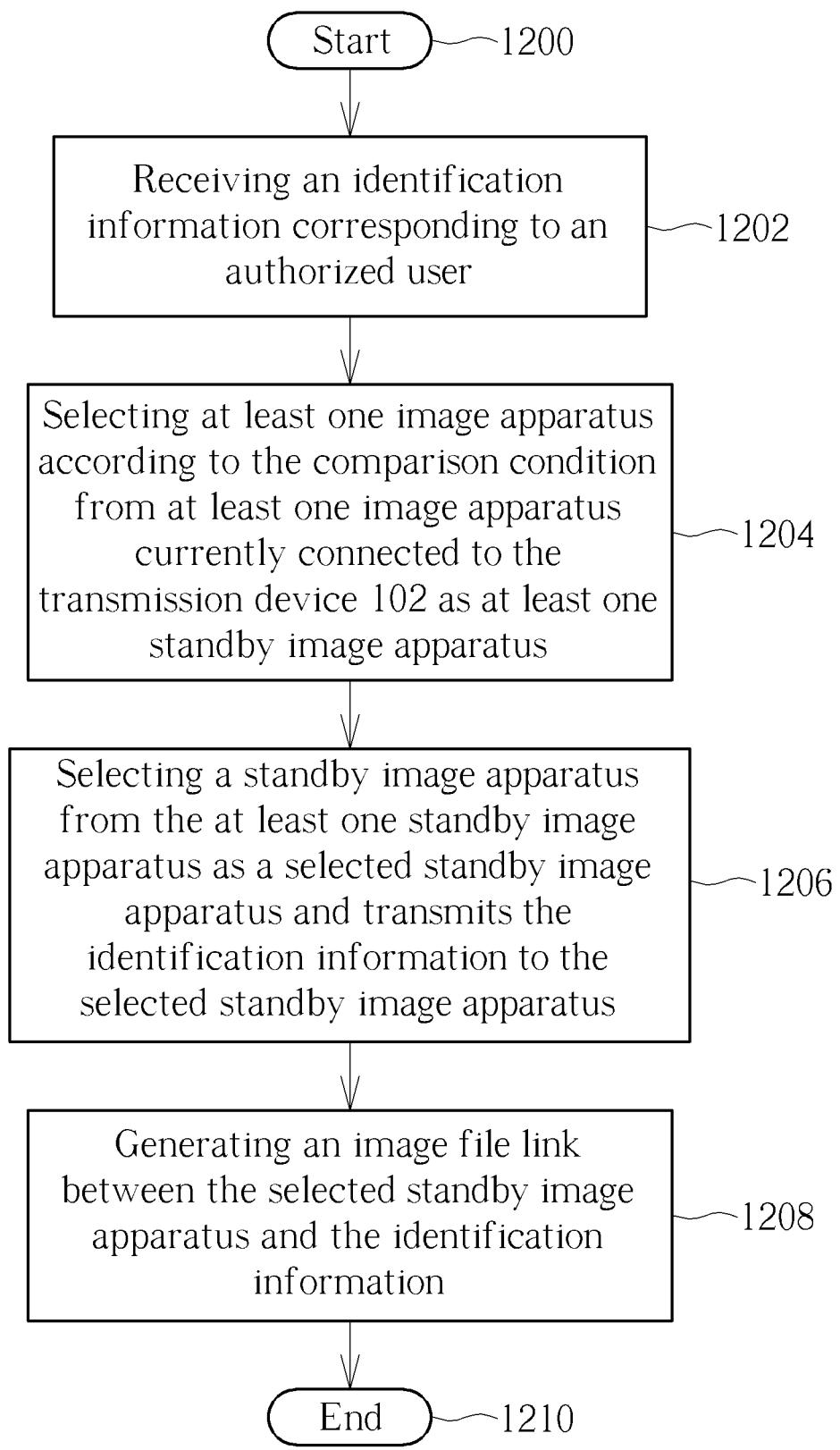
FIG. 12 is a flowchart illustrating an operation method of an image apparatus management system according to a second embodiment.

Please refer to FIG. 12. FIG. 12 is a flowchart illustrating an operation method of an image apparatus management system according to a second embodiment. The operation method in FIG. 12 is illustrated using FIGS. 1, 3-9. Detailed steps are as follows:

Step 1200: Start.

Step 1202: Receiving an identification information corresponding to an authorized user.

Step 1204: Selecting at least one image apparatus according to the comparison condition from at least one image apparatus currently connected to the transmission device 102 as at least one standby image apparatus.

Step 1206: Selecting a standby image apparatus from the at least one standby image apparatus as a selected standby image apparatus and transmits the identification information to the selected standby image apparatus.

Step 1208: Generating an image file link between the selected standby image apparatus and the identification information.

Step 1210: End.

In Step 1202, as shown in FIG. 1, the image apparatuses 106, 108, 110 are connected to the transmission device 102 through the ports 1, 2, 5, respectively. When the second authorized user intends to utilize one of the image apparatuses 106, 108, 110 currently connected to the transmission device 102, the second authorized user needs to log in the host 104 and inputs the identification information corresponding to the second authorized user to the host 104. In addition, after the host 104 receives the identification information inputted by the second authorized user, the control module will verify the identification information inputted by the second authorized user according to the identification information corresponding to the second authorized user stored in the database of the host 104.

In Step 1204, after the control module verifies the identification information inputted by the second authorized user, the control module can select at least one image apparatus from the image apparatuses 106, 108, 110 as at least one standby image apparatus according to the comparison condition. In addition, as shown in FIG. 3, when the control module selects the image apparatuses 106, 108 as the standby image apparatuses according to the comparison condition, the display 1042 can show information (e.g. identification code, remaining power, and memory space not occupied) of the image apparatuses 106, 108.

In Step 1206, if the control module selects more than one image apparatus from the image apparatuses 106, 108, 110 as the standby image apparatuses according to the comparison condition (for example, the control module selects the image apparatuses 106, 108 as the standby image apparatuses according to the comparison condition), the control module can randomly select one of the image apparatuses 106, 108 (i.e. the standby image apparatuses) as a selected standby image apparatus which will be assigned to second authorized user (for example, the control module randomly selects the standby image apparatus 106 as the selected standby image apparatus). In addition, in another embodiment of the present invention, after the control module selects the image apparatuses 106, 108 as the standby image apparatuses according to the comparison condition, the second authorized user can directly select the image apparatus 106 as the selected standby image apparatus not through the control module. In addition, as shown in FIG. 3, the display 1042 will pop the pop window 1044 showing, but not limited to, the identification code of the image apparatus 106 (i.e. the selected standby image apparatus), the port name (i.e. the port 1) where the image apparatus 106 is connected, and the name of the second authorized user after the control module selects the image apparatus 106 as the selected standby image apparatus and transmits the identification information inputted by the second authorized user to the image apparatus 106.

In Step 1208, after the control module transmits the identification information inputted by the second authorized user to the image apparatus 106, the control module or the selected image apparatus (i.e. the image apparatus 106) can generate the image file link between the image apparatus 106 (i.e. the selected standby image apparatus) and the identification information corresponding to the second authorized user.

To sum up, the present invention can select at least one image apparatus according to the comparison condition from at least one image apparatus currently connected to the transmission device as at least one standby image apparatus, and selects a standby image apparatus from the at least one standby image apparatus as a selected standby image apparatus, and generates an image file link between the selected standby image apparatus and identification information corresponding to an authorized user. Therefore, compared to the prior art, because the present invention selects the at least one standby image apparatus according to the comparison condition, remaining power and available memory space of the at least one image apparatus must be sufficient. In addition, because the present invention can select the standby image apparatus and generate the image file link between the selected standby image apparatus and the identification information, the authorized user will feel convenient, be willing to utilize the image apparatus management system, and be easy to execute category search on a plurality of image files generated by the plurality of image apparatuses of the image apparatus management system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An imaging apparatus management system, comprising:
 a plurality of imaging apparatuses, wherein each imaging apparatus of the plurality of imaging apparatuses is utilized to record surrounding images and generates at least one image file;
 a transmission device having a plurality of ports for electrically connecting to the plurality of imaging apparatuses; and
 a management apparatus for selecting at least one imaging apparatus according to a comparison condition from at least one imaging apparatus currently connected with the transmission device as at least one standby imaging apparatus to be utilized;
 wherein the selected standby imaging apparatus establishes an image file link between the selected standby imaging apparatus and an identification information, and generates at least one image file based on the image file link after the image file link is established.

2. The imaging apparatus management system of claim 1, wherein when an imaging apparatus of the plurality of imaging apparatuses is connected with the transmission device through a port of the plurality of ports, at least one image file stored in the imaging apparatus is copied automatically to an external storage device and the at least one image file stored in the imaging apparatus is erased after the at least one image file has been copied to an external storage device, and charges the imaging apparatus through the port.

3. The imaging apparatus management system of claim 1, wherein when an imaging apparatus of the plurality of imaging apparatuses is connected with the transmission device through a port of the plurality of ports, at least one image file stored in the imaging apparatus is copied to an external storage device according to a copy command sent from the management apparatus to the imaging apparatus and the at least one image file stored in the imaging apparatus is erased after the at least one image file has been copied to an external storage device, and charges the imaging apparatus through the port.

4. The imaging apparatus management system of claim 1, wherein the comparison condition comprises at least one of whether remaining power of an imaging apparatus exceeding a predetermined percentage, whether at least one image file stored in the imaging apparatus has been copied to an external storage device, and whether at least one image file stored in the imaging apparatus has been erased after the at least one image file stored in the imaging apparatus has been copied to the external storage device.

5. The imaging apparatus management system of claim 1, wherein the management apparatus further receives the identification information and selects a standby imaging apparatus from the at least one standby imaging apparatus, and transmits the identification information to the selected standby imaging apparatus.

6. The imaging apparatus management system of claim 5, wherein the identification information corresponds to an authorized user utilizing the imaging apparatus management system.

7. The imaging apparatus management system of claim 6, wherein the identification information is a biological feature of the authorized user read by a biological identification device.

8. The imaging apparatus management system of claim 5, wherein the identification information is an identification number read from an identification card by a card reader.

9. The imaging apparatus management system of claim 5, wherein the identification information is a set of symbols, texts or combination thereof inputted by an input interface.

10. The imaging apparatus management system of claim 5, wherein when the management apparatus selects the standby imaging apparatus, the selected standby imaging apparatus generates and outputs a special notice to an authorized user utilizing the imaging apparatus management system.

11. The imaging apparatus management system of claim 5, wherein after the selected standby imaging apparatus is unplugged from the transmission device, the selected standby imaging apparatus needs to verify the identification information through an input interface of the selected standby imaging apparatus to boot up or start to record surrounding images and generates at least one image file after booting the selected standby imaging apparatus.

12. The imaging apparatus management system of claim 5, wherein a display shows status of the at least one standby imaging apparatus, and the display further shows an identification code of the selected standby imaging apparatus corresponding to the identification information, wherein the identification code is a machine code.

13. The imaging apparatus management system of claim 5, wherein when the management apparatus transmits the identification information to the selected standby imaging apparatus, the identification information is stored in a radio frequency identification (RFID) tag or a near-field communication (NFC) tag of the selected standby imaging apparatus.

14. The imaging apparatus management system of claim 1, wherein the image file link corresponds to a header of at least one image file generated by the selected standby imaging apparatus storing the identification information.

15. The imaging apparatus management system of claim 1, wherein the image file link corresponds to the identification information acting as a file name of at least one image file generated by the selected standby imaging apparatus.

16. The imaging apparatus management system of claim 1, wherein the image file link corresponds to a predetermined space of a memory in the selected standby imaging apparatus storing at least one image file generated by the selected standby imaging apparatus, and the at least one image file generated by the selected standby imaging apparatus stored in the predetermined space is only accessed through the identification information.

17. The imaging apparatus management system of claim 1, wherein the management apparatus further utilizes the image file links corresponding to a plurality of image files generated by the selected standby imaging apparatuses to classify the plurality of image files.

18. An operation method of an imaging apparatus management system, wherein the imaging apparatus management system comprises a plurality of imaging apparatuses, a transmission device, and a management apparatus, the operation method comprising:

receiving an identification information corresponding to an authorized user;

selecting at least one imaging apparatus according to a comparison condition from at least one imaging apparatus currently connected to the transmission device as at least one standby imaging apparatus;

selecting a standby imaging apparatus from the at least one standby imaging apparatus as a selected standby imaging apparatus and transmitting the identification information to the selected standby imaging apparatus; and establishing an image file link between the selected standby imaging apparatus and the identification information, wherein the selected standby imaging apparatus generates at least one image file based on the image file link after the image file link is established.

19. The operation method of claim 18, wherein the comparison condition comprises at least one of whether remaining power of an imaging apparatus exceeding a predetermined percentage, whether at least one image file stored in the imaging apparatus has been copied to an external storage device, and whether at least one image file stored in the imaging apparatus has been erased after the at least one image file stored in the imaging apparatus has been copied to the external storage device.

20. The operation method of claim 18, wherein the identification information is a biological feature of the authorized user read by a biological identification device, or an identification number read from an identification card by a card reader, or a set of symbols, texts or combination thereof inputted by an input interface.

21. The operation method of claim 18, wherein the image file link corresponds to a header of the at least one image file generated by the selected standby imaging apparatus storing the identification information, or corresponds to the identification information acting as a file name of the at least one image file generated by the selected standby imaging apparatus, or corresponds to a predetermined space of a memory in the selected standby imaging apparatus storing the at least one image file generated by the selected standby imaging apparatus.

* * * * *